April 6, 1965  P. J. MAZZIOTTI  3,176,477
UNIVERSAL JOINT OF THE CONSTANT VELOCITY TYPE
Filed May 17, 1962

United States Patent Office 3,176,477
Patented Apr. 6, 1965

3,176,477
UNIVERSAL JOINT OF THE CONSTANT
VELOCITY TYPE
Philip J. Mazziotti, Toledo, Ohio, assignor to Dana Corporation, Toledo, Ohio, a corporation of Virginia
Filed May 17, 1962, Ser. No. 195,596
12 Claims. (Cl. 64—21)

This invention relates to constant velocity universal joints in general and more particularly to such a universal joint which is adapted for large angles of operation.

Constant velocity universal joints of the ball type are well known in the prior art and have been widely used where it is desired to obtain a constant velocity transfer of rotational forces from the driving to the driven member. The prior art also discloses such constant velocity joints which include means for allowing the joint members to telescope relative to each other so that the joint not only serves to transfer rotational energy but also functions to accommodate axial displacement between the driving and driven members. However, when such prior art devices were adapted to accommodate such axial movement, the ability to accommodate angular displacement between the driving and driven members was reduced.

It is, therefore, an object of this invention to provide a constant velocity universal joint wherein the joint members are adapted for relative axial movement.

It is another object of this invention to provide such a universal joint wherein the joint members may operate at large angles.

It is yet another object of this invention to provide a ball type constant velocity universal joint wherein the means receiving the drive balls are adapted so that the universal joint members may assume a large angular displacement relative to each other while still retaining the ability to move axially.

It is a still further object of this invention to provide a telescoping constant velocity universal joint of the ball type wherein the grooves receiving the drive balls are prepared arcuately with respect to the axis of the universal joint so that large angular displacement of the universal joint members may be accommodated.

Further and other objects of this invention will become apparent upon consideration of the specification in view of the following drawings wherein.

Figure 1:
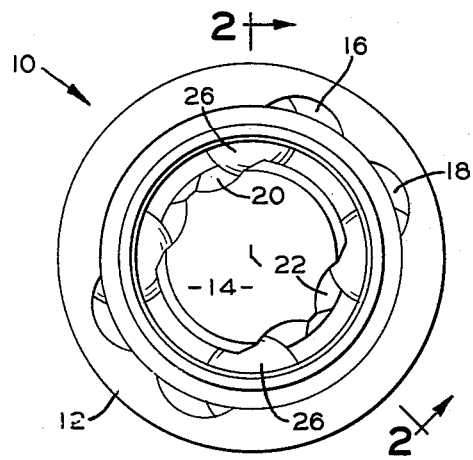
FIG. 1 is an end elevational view of a universal joint embodying this invention.

In a preferred embodiment of this invention, inner and outer members are disposed in spaced relationship and adapted for angular and axial displacement. A plurality of drive balls are disposed between the members and adapted to transmit torque therebetween and serve as the intermediate revolvable member of the universal joint so that the same will transmit rotational forces at a constant velocity. The drive balls are maintained in uniplanar relationship by means of a cage engaging the same.

Means are provided to maintain the drive balls and cage in a position which bisects the angle defined by the inner and outer members. More particularly the inner and outer members are each provided with grooves disposed in paired cooperating relationship with the cooperating grooves displaced transversely from the axial direction oppositely with respect to each other so that the paired grooves are in an intersecting, or crossed, mirror image relationship. Some of the grooves in each member are displaced oppositely with respect to the other grooves in that member so that equal and opposite total axial urging forces are imposed upon all the drive balls and the cage containing the balls so that the balls are positioned in the bisecting plane in a manner well known in the art.

In order to accommodate large angular displacement between the outer and inner members, the axes of the grooves containing the drive balls are also formed arcuately with respect to and radially approaching the axis of the member containing the same. In this manner the maximum torque transmitting capacity of a given diameter universal joint can be realized while still maintaining large angular displacement, relative axial movement, and adequate groove depth, and wall thickness of the member for satisfactory operation. Another manner of defining the groove displacement is that the groove axes when rotated about the longitudinal axis of the respective member substantially define an ellipsoid of revolution with the axes disposed in a diagonal or helical manner upon the surface of the substantial ellipsoid of revolution. While the axes have been defined as being disposed in a diagonal or helical manner in order to effect equal and opposite forces on the drive balls for positioning purposes, other manners of groove displacement will be satisfactory as long as the grooves impose equal and opposite total axial urging forces on the drive balls and have the axes thereof formed arcuately with respect to the axis of the member containing the same.

Referring now to the drawings, a universal joint shown generally at 10 includes an outer annular member 12 telescopically receiving a truncated substantially ellipsoidal inner member 14 in a cylinder axially extending opening 15 defined thereby. The members 12 and 14 are radially spaced from each other and adapted for both angular and axial displacement. Either the member 12 or 14 may serve as the driving or driven member and are suitably adapted for attachment in a driveline (not shown) in a well known manner.

Figure 2:
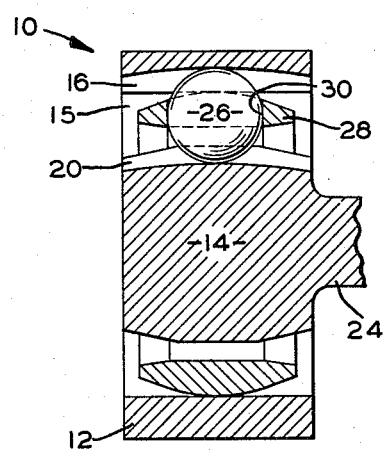
FIG. 2 is a view taken along the lines 2—2 of FIG. 1 with the grooves shown as axial grooves instead of circumferentially displaced for added clarity.
Figure 3:
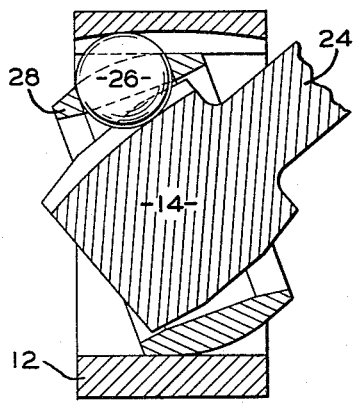
FIG. 3 is a view according to FIG. 2 with the members of the universal joint displaced angularly.

The outer and inner members 12 and 14 are provided with a plurality of equally spaced paired cooperating grooves. In FIGS. 2 and 3 the grooves are shown out of their normal transversely displaced position and depicted as axially straight grooves so that the cooperation thereof is more clearly illustrated. The outer race 12 has two pluralities of grooves 16 and 18 transversely displaced oppositely and equally with respect to one another. More particularly each groove 16 or 18 while extending generally axially, has an axis with both axial and transverse components. The inner race 14 is provided with two pluralities of grooves 20 and 22 disposed in cooperating relationship with the grooves 16 and 18 respectively and formed in an intersecting, or crossed, mirror image relationship therewith. More particularly each groove 20 and 22 while extending generally axially has an axis with both axial and transverse components and is displaced transversley oppositely and equally with respect to the grooves 16 and 18 with which it is in a cooperating relationship.

As clearly shown in the drawings and more particularly in FIG. 2, wherein the grooves are shown as axial grooves instead of in their true transversely displaced position for added clarity, the grooves 16 and 18 in the outer member and the grooves 20 and 22 in the inner member are also formed arcuately with respect to and radially approach the axis of the member containing the same. By forming the grooves arcuately as described, large angular deflection can be obtained between the outer and inner members 12 and 14; such deflection being limited by the engagement of a shaft 24, which is formed integrally with the inner member 14, with the outer member 12.

A plurality of torque transmitting means in the form of drive balls 26 are provided to transmit torque between the members with a drive ball 26 being disposed in each pair of cooperating grooves 16, 20 and 18, 22. A cage 28 is disposed in the space between the outer and inner members 12 and 14 and is provided with a plurality of openings 30 in registration with the drive balls 26 and adapted to receive the same thereby maintaining the drive balls 26 in uniplanar relationship. The cage 28 while shown as engaging the outer member 12 is not axially positioned by such engagement but is freely axially and angularly movable relative to both members. The engagement merely radially positions the cage 28 relative to the outer and inner members 12 and 14.

Figure 4:
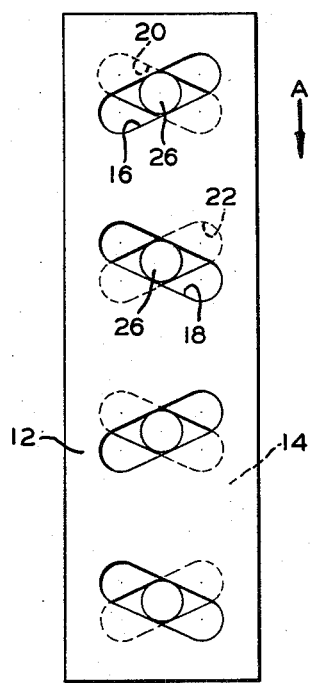
FIG. 4 is a diagrammatic view in the nature of a development of the universal joint of FIGS. 1 and 2.

As clearly shown in FIG. 4, with the inner member 14 held stationary and the outer member 12 rotating in the direction of the arrow A, the drive balls 26 contained in the intersecting position of the grooves 16 and 20 are urged to the right while the drive balls 26 contained in the intersecting position of the grooves 18 and 22 are urged to the left. Since the equally displaced grooves impose a total balanced axial urging force on the balls and the balls 26 are maintained in a single plane by means of the cage 28, the drive balls remain in the intersection of the grooves 16, 20 and 18, 22, which intersections, by well known geometric principles define the bisecting plane of the angular relationship of the universal joint members. It is, therefore, apparent that by means of the cage 28 the balls 26 are maintained in uniplanar relationship and that by means of the intersection of the grooves 16, 20 and 18, 22 the plane of the balls is positioned whereby the same bisects the angle defined by the inner and outer members.

Figure 5:
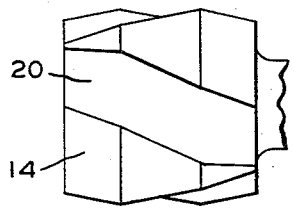
FIG. 5 is a view of the inner member of the universal joint of FIG. 1 disclosing the groove configuration therein.
Figure 6:
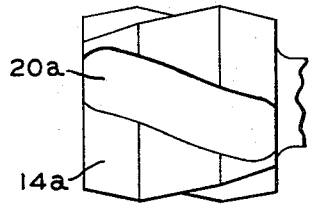
FIG. 6 is a view according to FIG. 5 of another manner of displacing the grooves of the universal joint.

Referring tot FIG. 5, a plan view of a groove 20 in the inner member 14 is shown. Here the groove 20 is disclosed as having a diagonal type straight axis (although such axis is also arcuate with respect to the axis of the member 14) while in FIG. 6, the groove 20a in the inner member 14a is disclosed as having a helical type axis (although such axis is also arcuate with respect to the axis of the member 14a). Either type of groove axis configuration is satisfactory for the purpose of this invention as well as other groove configurations approaching these, as long as the paired grooves are in a mirror image relationship of each other and impose a total balanced axial urging force on the drive balls.

From the foregoing it is apparent that a constant velocity universal joint has been described wherein the joint members are adapted for relative axial movement; which may operate at large angles; wherein the means receiving the drive balls are adapted so that the universal joint members may assume large angular displacement relative to each other while still retaining the ability to move axially relative to each other; and wherein the drive balls are received in grooves which are prepared arcuately with respect to the axis of the universal joint so that large angular displacement of the universal joint members may be accommodated.

While only two embodiments of this invention have been shown and described, it is apparent that there may be many changes in structure and operation without departing from the scope of this invention as defined by the appended claims.

What is claimed is:

1. A constant velocity universal joint of the type wherein inner and outer members are provided with grooves formed therein and disposed in paired cooperating relationship and are coupled for unitary rotation by means of a plurality of torque transmitting means engaging said grooves characterized in that said members are spaced from each other, are free from positionable engagement and are angularly and axially movable relative to each other, and the axes of said grooves are formed arcuately with respect to the axis of the member containing the same.

2. A constant velocity universal joint according to claim 1 wherein the axes of said grooves also have axial and transverse components.

3. A constant velocity universal joint according to claim 1 including cage means for maintaining said plurality of torque transferring means in uniplanar relationship.

4. A universal joint comprising in combination an outer member having an axially extending opening therein, an inner member received in said opening and being spaced from said outer member and free from positionable engagement with and angularly and axially movable relative thereto, a plurality of grooves formed in each of said members with the grooves in said inner member disposed in paired cooperating relationship with the grooves in said outer member, a plurality of torque transmitting means with at least one disposed in each of said pairs of grooves, means including at least said grooves for maintaining said torque transmitting means in the plane bisecting the angle defined by said inner and outer members, said grooves having the axes thereof formed arcuately with respect to and radially approaching the axis of the member containing the same.

5. A universal joint comprising in combination an outer member having an axially extending opening therein, an inner member received in said opening and being spaced from said outer member and free from positionable engagement with and angularly and axially movable relative thereto, a plurality of grooves in each of said members with the grooves in said inner member disposed in paired cooperating mirror image relationship with the grooves in said outer member, a plurality of torque transmitting means with at least one disposed in each of said pairs of grooves, and means including at least said grooves for maintaining said torque transmitting means in the plane bisecting the angle defined by said inner and outer members, the axes of said grooves having axial and transverse components and being formed arcuately with respect to and radially approaching the axis of the member containing the same.

6. A universal joint comprising in combination an outer member having an axially extending opening therein, an inner member received in said opening and being spaced from said outer member and free from positionable engagement therewith and angularly and axially movable relative thereto, a plurality of grooves formed in each of said members with the grooves in said inner member disposed in paired cooperating relationship with the grooves in said outer member, a plurality of torque transmitting means with at least one disposed in each of said pair of grooves, cage means engaging said plurality of torque transmitting means, and means including at least said grooves and said cage means for maintaining said torque transmitting means in a uniplanar relationship bisecting the angle defined by said inner and outer members, said grooves having the axes thereof formed arcuately with respect to and radially approaching the axis of the member containing the same.

7. A universal joint comprising in combination an outer member having an axially extending opening therein, an inner member received in said opening and being spaced from said outer member and free from positionable engagement therewith and angularly and axially movable relative thereto, a plurality of grooves in each of said members with the grooves in said inner member disposed in paired cooperating relationship with the grooves in said outer member, a plurality of torque transmitting means with at least one disposed in each of said pairs of grooves, a cage means engaging said plurality of torque transmitting means, and means including at least said grooves and said cage means for maintaining said torque transmitting means in uniplanar relationship bisecting the angle defined by said inner and outer members, the axes of said grooves having axial and transverse components and being formed arcuately with respect to the axis of the member containing the same.

8. A universal joint comprising in combination an outer member having an axially extending opening therein, an inner member received in said opening and being spaced from said outer member and free from positionable engagement therewith and angularly and axially movable relative thereto, a first and a second plurality of grooves in each of said members with the first plurality of grooves in said inner member disposed in paired cooperating relationship with the first plurality of grooves in said outer member and a second plurality of grooves in said inner member disposed in paired cooperating relationship with the second plurality of grooves in said outer member, a plurality of torque transmitting means with at least one disposed in each of said cooperating grooves, a cage means engaging said plurality of torque transmitting means, and means including at least said grooves and said cage means for maintaining said torque transmitting means in uniplanar relationship bisecting the angle defined by said inner and outer members, the axes of said grooves having axial and transverse components and being formed arcuately with respect to the axis of the member containing the same, said first plurality of grooves in said outer member having a transverse component opposite to the transverse component of the second plurality of grooves in said outer member.

9. A constant velocity universal joint of the type wherein inner and outer members each have formed therein a plurality of grooves, the grooves in the outer member are disposed in paired cooperating relationship with the grooves in the inner member, and the members are coupled for unitary rotation by means of a plurality of torque transmitting means engaging said grooves, characterized in that said members are spaced from each other, are free from positionable engagement and are angularly and axially movable relative to each other, and said groove axes when rotated about the longitudinal axis of the member containing the same substantially define an ellipsoid of revolution.

10. A constant velocity universal joint of the type wherein inner and outer members each contain a plurality of grooves, the grooves in the outer member are disposed in paired intersecting mirror image relationship with the grooves in the inner member, and the members are coupled for unitary rotation by means of a plurality of torque transmitting means engaging said grooves at the intersecting position thereof, characterized in that said members are spaced from each other, are free from positionable engagement and are angularly and axially movable relative to each other, and said groove axes when rotated about the longitudinal axis of the member containing the same define an ellipsoid of revolution with the groove axes lying on the surface of the ellipsoid and occupying a position removed from axial alignment of the axis of said member.

11. A constant velocity universal joint of the type wherein inner and outer members each contain a plurality of grooves, the grooves in the outer member are disposed in paired cooperating mirror image relationship with the grooves of said inner member, and the members are coupled for unitary rotation by means of a plurality of torque transmitting means engaging said grooves characterized in that said members are spaced from each other, are free from positionable engagement and are angularly and axially movable relative to each other, and said groove axes when rotated about the longitudinal axis of the member containing the same define an ellipsoid of revolution with the groove axes lying on the surface of the ellipsoid and occupying a position removed from axial alignment with the axis of said member, and some of said grooves in each member being removed from axial alignment with the axes of said member oppositely with respect to the other of said grooves in said member.

12. A universal joint comprising in combination an outer member having an axially extending opening therein, an inner member received in said opening and being spaced from said outer member, a first and a second plurality of grooves in each of said members with the first plurality of grooves in said inner member disposed in paired cooperating relationship with the first plurality of grooves in said outer member and a second plurality of grooves in said inner member disposed in paired cooperating relationship with the second plurality of grooves in said outer member, a plurality of torque transmitting means with at least one disposed in each of said cooperating grooves, and annular cage means engaging said plurality of torque transmitting means and maintaining the same in a uniplanar relationship, at least a portion of said cage means being disposed in the space between said members and circumferentially surrounding said inner member and slideably engaging one of said members and being spaced from the other of said members whereby said members are angularly and axially movable relative to each other and to said cage means, the axes of said grooves having axial and transverse components and being formed arcuately with respect to the axis of the member containing the same, said first plurality of grooves in said outer member having a transverse component opposite to the transverse component of the second plurality of grooves in said outer member whereby said groove means maintain the plane of said torque transmitting means in a position bisecting the angle defined by said inner and outer members.

References Cited by the Examiner

UNITED STATES PATENTS

| | | | |
|---|---|---|---|
| 2,309,939 | 2/43 | Dodge | 64—21 |
| 2,325,460 | 7/43 | Amberg | 64—21 |
| 2,352,776 | 7/44 | Dodge | 64—21 |
| 3,041,858 | 7/62 | Wildhaber | 64—21 |

ROBERT C. RIORDON, *Primary Examiner.*

KARL J. ALBRECHT, *Examiner.*